United States Patent [19]

Pechau et al.

[11] 4,406,198

[45] Sep. 27, 1983

[54] DRUM-TYPE WIRE SHEAR

[75] Inventors: Gerhard Pechau; Ronald Schwartz; Rudi Jacob, all of Magdeburg, German Democratic Rep.

[73] Assignee: Veb Schwermaschinenbau-Kombinat "Ernst Thälmann" Magdeburg, Magdeburg, German Democratic Rep.

[21] Appl. No.: 266,100

[22] Filed: May 21, 1981

[51] Int. Cl.³ .............................................. B23D 25/12
[52] U.S. Cl. ........................................ 83/170; 83/306; 83/322; 83/345
[58] Field of Search ................. 83/306, 307, 105, 106, 83/285–292, 340, 342, 345, 322, 170, 15

[56] References Cited

U.S. PATENT DOCUMENTS 3,760,670 9/1973 Poran ............................... 83/306 X

FOREIGN PATENT DOCUMENTS 129127 12/1977 German Democratic Rep. ... 83/307
145237 12/1980 German Democratic Rep. ... 83/307
817548  7/1959 United Kingdom ................. 83/105

*Primary Examiner*—James M. Meister
*Attorney, Agent, or Firm*—Karl F. Ross; Herbert Dubno

[57] ABSTRACT

A wire shear has a pair of vertically superposed cutter drums defining a nip and having at least one cutter blade. These drums have parallel axes defining a vertical plane. A swingable elongated guide tube has a downstream end closely juxtaposed with and directed into the nip. This tube is mounted at its upstream end for swinging about vertical and horizontal axes at the upstream end. A wire is fed into the upstream end at high speed. A cooling sleeve surrounding the guide tube has lateral openings through which a coolant is introduced into the interior of the sleeve to cool the tube and the wire in it. An upstream guide is engageable upstream of the plane with the downstream end and with the wire issuing therefrom and extends into the drum nip substantially to the plane. A downstream guide downstream of the plane is aligned with the upstream guide and has a floor plate extending upstream substantially to the plane and a guide wall extending upstream past the plane and past the downstream end. The upstream guide can be raised to lift the downstream end of the guide tube and feed the wire issuing therefrom into the nip of the cutter drums.

10 Claims, 10 Drawing Figures

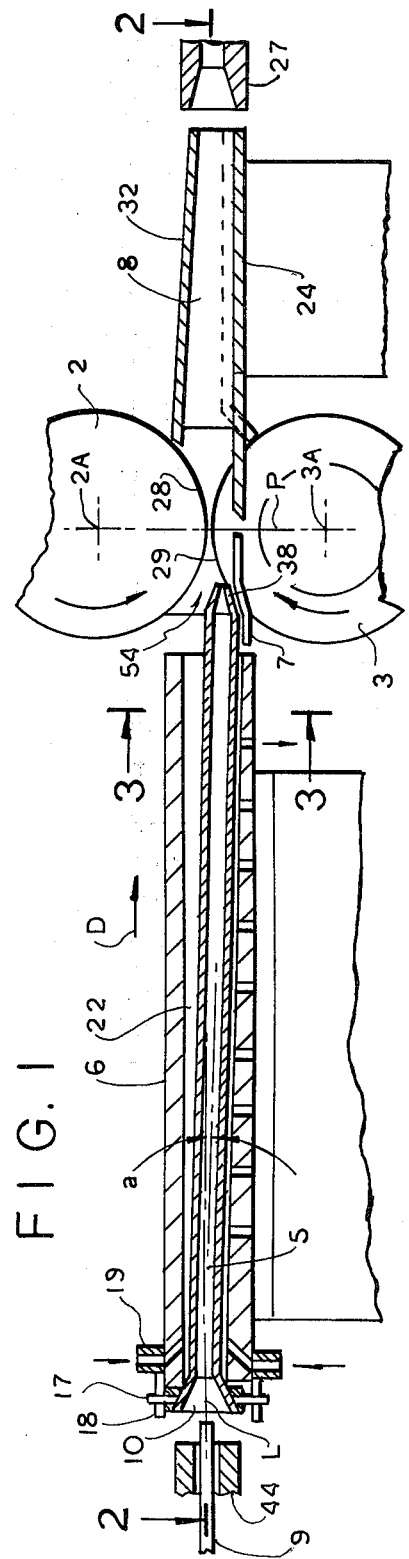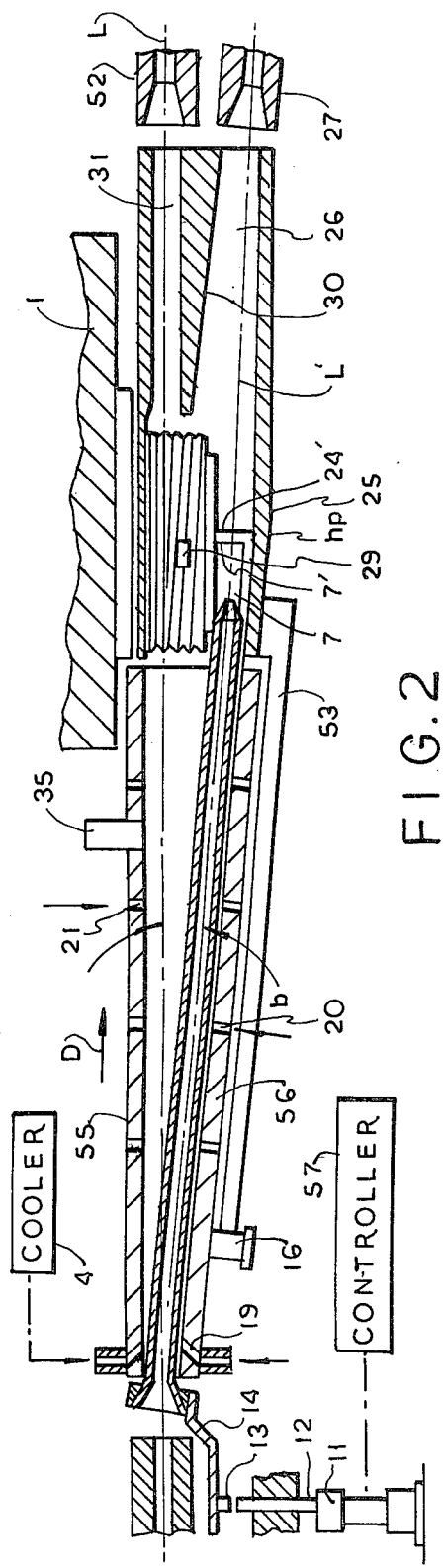

FIG. 3
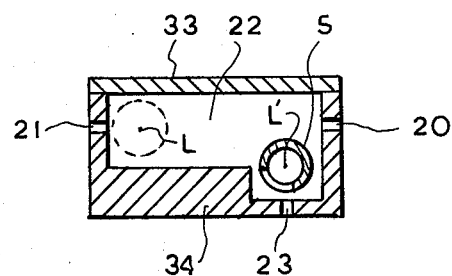
FIG. 4
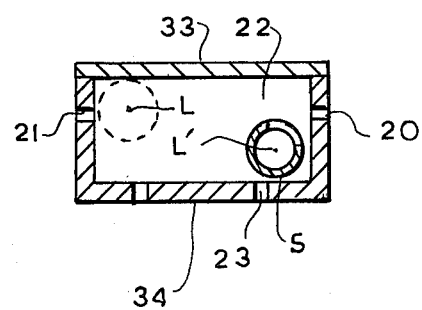
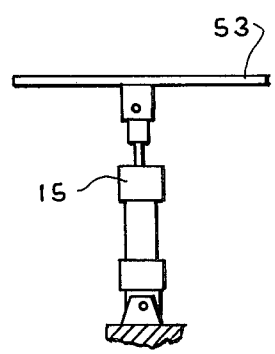
FIG. 5

DRUM-TYPE WIRE SHEAR

FIELD OF THE INVENTION

The present invention relates to a drum-type wire shear of the type used in a wire mill for cutting the normally scrapped leading and trailing ends off a piece of wire.

BACKGROUND OF THE INVENTION

It is standard practice, as for instance known from the commonly owned and copending application Ser. Nos. 265,819 and 266,097 of E. Wyzgol as well as from East German Pat. Nos. 129,127 and 215,596, to cut the end off a piece of wire in a wire-drawing mill by means of a drum-type shear. Such an apparatus has two vertically superposed drums rotating about respective parallel axes defining a vertical plane. The drums are formed with helical grooves of opposite hand and at least one of these drums carries a cutter blade. The wire to be cut is fed normally through a guide tube to the nip defined by the drums which are counterrotated. The wire is thus drawn axially inwardly by the drum grooves to the blade where it is cut through.

Complex systems must normally be provided to insure that the downstream end of the guide tube is moved axially at exactly the same rate as the rate of axial advance of the wire engaged between the two drum grooves. Since the wire is moving relatively rapidly, normally around 50 m/sec, it is essential, especially with a thin wire having a diameter of around 5.5 mm-6.5 mm, that the two speeds be perfectly synchronized. Otherwise kinking and subsequent breaking of the wire is likely. Such breakage results in extremely costly down time for the entire drawing/rolling line.

Further complex systems are provided at the downstream side of the pair of cutter drums to separate the cropped end sections of the wire from the good center part. These arrangements also frequently require deflection of the wire through such a sharp angle that kinking and breakage of the wire is likely.

OBJECTS OF THE INVENTION

It is therefore an object of the present invention to provide an improved drum-type wire cutter.

Another object of the present invention is to provide such a cutter which is less likely to kink the wire than any of the prior-art systems.

SUMMARY OF THE INVENTION

These objects are attained according to the instant invention in an arrangement of the above-described general type wherein the guide tube is swingable about vertical and horizontal axes at its upstream end for movement of its downstream end tranversely relative to the transport direction of the wire fed at high speed into the upstream end of the tube. A cooling jacket or sleeve spacedly surrounds the guide tube between its end and a coolant is passed through this sleeve to cool the guide tube and wire in it. A guide upstream of the drum plane is engageable with the downstream guide-tube end and with the wire issuing therefrom into the drum nip virtually up to the drum plane. A guide downstream of the plane is aligned with the upstream guide and has a floor plate extending upstream substantially to this plane and a guide wall extending upstream past the plane and past the downstream guide-tube end. The upstream guide can be raised to insert the wire into the mating grooves of the two cutter drums.

With the system according to the instant invention, therefore, the wire is supported virtually all of the way through the cutter-drum nip. Thus it will be virtually impossible even for a relatively small-diameter wire to kink and break. The downstream end of the guide tube according to this invention is not actually guided, but is just urged in the appropriate direction. Since there is virtually no unsupported wire between the wire portion engaged by the cutter drums and the wire in the guide tube, the wire itself will pull the downstream guide-tube end axially inwardly, ensuring perfect synchronization between the axial movement of the downstream guide-tube end and the wire as advanced axially inwardly by the drum grooves.

According to further features of this invention, the downstream guide is formed with scrap-wire and good-wire exit passages that have upstream mouths offset axially from each other. A wedge or partition separates these two passages and has flanks forming an angle of 15°-45° to each other, with these two flanks meeting at a vertical line parallel to the drum plane at the upstream partition end.

In accordance with another feature of this invention the sleeve is provided adjacent the downstream guide-tube end with an electromagnet that can attract and hold the tube in a position aligned with the good-wire passage and with the axially inner ends of the drum grooves. Thus, once again, the downstream guide-tube end is not moved positively, but is only urged in the appropriate direction, either by the wire as moved by the drum grooves or by the electromagnet. The only positive motion is the lifting of the upstream guide to engage the wire in the groove of the normally axially longer upper drum, so that once thus engaged the rotating upper drum will move the wire and guide tube axially inwardly into the groove of the lower drum too and eventually to the cutter blades provided immediately outside the axially inner ends of these grooves.

It is possible according to this invention to provide the downstream guide-tube end with bushings when a small-diameter wire is being cropped. Thus the guide-tube end will be sure to fit perfectly in the mating drum grooves.

A wedge arrangement can be used to lift the upstream guide for fitting of the wire and tube end into the upper-drum groove. Thus a wedge carried on a horizontally effective fluid cylinder can push up the upstream guide.

According to the instant invention the wire will not normally be deflected through more than 2° upstream of the cutter drums. Downstream of the cutter drums, where breakage is very rare, the deflection will normally lie between 2° and 15°, which will not normally be enough to kink the wire.

DESCRIPTION OF THE DRAWING

FIG. 1 is a side view of a first embodiment of the apparatus according to the instant invention;

FIG. 2 is a longitudinal section taken along line II—II of FIG. 1;

FIG. 3 is a cross section taken along line III—III of FIG. 1;

FIG. 4 is a cross section similar to that of FIG. 3 showing a second embodiment of the apparatus according to the present invention;

FIG. 5 is a side view of a detail of the arrangement of FIGS. 1 and 2;

SPECIFIC DESCRIPTION

Figure 6:
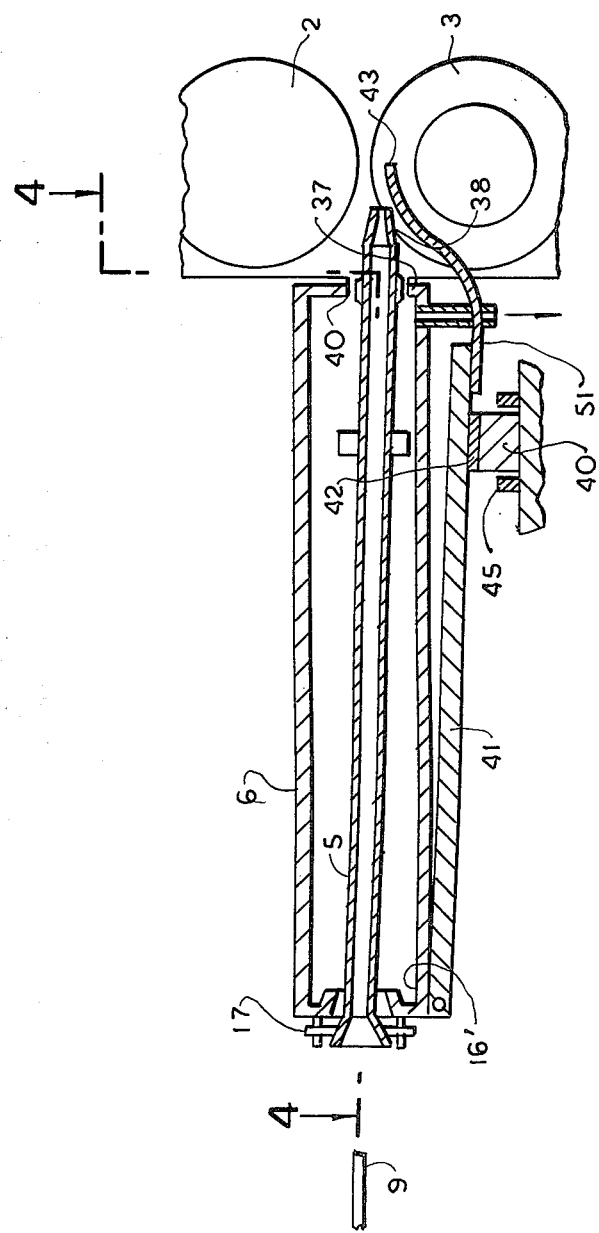
FIG. 6 is a longitudinal section through the second embodiment of the apparatus of this invention.

As shown in FIGS. 1 and 2, a drum-type shear 1, which may be of the type described in the above-cited commonly owned patent applications, has an upper cutter drum 2 with a blade 28 and a lower drum 3 with a blade 29. The drums 2 and 3 are normally counterrotated about respective parallel axes 2A and 3A defining a vertical plane P extending perpendicular to an upstream-to-downstream travel direction D of a workpiece wire 9 through the apparatus. The wire 9 enters the apparatus from a fixed upstream feed tube 44 and cut-off ends exit from the machine through a fixed downstream feed tube 27 while portions of wire to be further processed or prepared for marketing exit from the apparatus through a fixed downstream feed tube 52.

A movable guide tube 5 is mainly received in and surrounded by a cooling sleeve or jacket 6 and has a funnel-like flared upstream end 10 and a cylindrical central bore 22. This upstream end 10 is provided with upright pivot pins or gudgeons 17 received in slotted lugs 18 carried at the upstream end of the sleeve 6, with the slots elongated in the transport direction D. In addition the tube 5 has a downstream guide end 38 reaching virtually to the plane P and swingable, due to the mounting system, both vertically through a small acute angle a and horizontally through a small acute angle b.

The jacket or sleeve 6 that surrounds the guide tube 5 has a channel-shaped or U-section base part 34 (see FIGS. 3 and 4) and a flat cover 33 and is formed at its upstream end with coolant-inlet holes or nozzles 19 that open at an angle of 15°-45° to a path line L perpendicular to the plane P and defined between the upstream fixed guide tube 44 and the downstream fixed guide 52. A cooler 4 provided with an appropriate supply of cool water and a pump is connected to these nozzles 4 to direct streams of water at the tube 5 both to cool it and its wire and to direct it in the desired transverse direction as will become apparent below. In addition the sleeve 6 is formed on its side walls 55 and 56 with perpendicularly throughgoing bores or holes 20 and 21 from which water also supplied by the cooler 4 is fed to the interior of the sleeve 6 so as to cool the tube 5 and the wire 9 therein. This water, although cool air could be used, flows out of the sleeve 6 through drain holes 23 in its floor.

The interior of the sleeve 6 can be generally L-shaped as shown in FIG. 3, with the low point corresponding the the deflected position of the tube 5 and the high point showing the nondeflected position of the tube 5 in dashed lines. Alternately as shown in FIG. 4 the interior of the sleeve 6 can be rectangular.

Pivoted about a horizontal pivot 16 on the fixed sleeve 6 is a wire guide 7 connected to the pivot 6 by an arm 53. The guide 7 is formed as a plate that can engage under the downstream end 38 of the tube 5 and also under the wire 9 issuing therefrom. The downstream edge 7' of this guide 7 lies on the plane p. The lower cutter drum 3 is axially shorter than the upper drum 2, and the guide 7 is no wider than the overhanging axially outer end of the upper drum 2 so that this guide 7 can merely move the tube end 38 and wire 9 upward when they are in the defected position of FIGS. 1 and 2 with the wire following a path line L' offset from the line L and leading from the fixed upstream guide 44 to the fixed downstream guide 27. An upright fluid cylinder or ram 15 shown only in FIG. 5 engages the arm 53 and can vertically displace the guide 7 between its upper and lower positions.

The movable guide tube 5 is provided on its upstream end with an arm 14 extending upstream and provided with an elastic bar 13 extending vertically and engageable by a piston rod 12 of a hydraulic or pneumatic cylinder 11. When the piston rod 12 is pressed against the elastic bar 14 the guide tube 5 is therefore urged into the illustrated deflected positions.

Downstream of the nip 54 of the drums 2 and 3 there is provided a fixed guide 8 having a base plate 24 with an upstream edge spaced slightly downstream of the plane P and forming a horizontal continuation of the guide 7, and relative to the axes 2A and 3A an axially outer wall 25 extending parallel to the path line L' and extending upstream beyond the plane P to a point that is, in fact, upstream of the downstream end 38. This guide has a central wedge 30 defining a waste-wire passage 26 leading to the downstream guide 27 and a good-wire passage 31 leading to the downstream guide 52. An easily removable cover 32 vertically closes these passages 26 and 31 and can be taken off for cleaning or servicing of the guide 8. Thus the guide 8 insures that the tube end 38 and the wire 9 issuing from it will not have any substantial unsupported sections.

The vertical straight wall 55 of the sleeve 6 that extends parallel to the path L and that is formed with the holes 21 is provided with an electromagnetic 35 that is perpendicular to the path L. Energization of this electromagnet 35 therefore can attract the steel tube 5 and hold it in its straight or undeflected position centered on the path line L.

With this system of FIGS. 1, 2, 3, 9, and 10 the wire 9 normally enters the upstream end 10 of the guide tube 5 from the tube 44 at a relatively high speed of about 50 m/sec, which is approximately 112 miles/hour. At the start the cylinder 11 is pressurized and the electromagnet 35 is not energized so that the guide tube 5 lies on the path L' and the wire issuing from it passes under the overhanging outer end of the upper drum 2 and through the scrap-wire passage 26 to the output guide 27. When a controller 57 connected to the cylinders 15 and 11 and to the electromagnet 35 senses that a sufficiently long piece of the wire has been fed into the guide 27, it generates signals which depressurize the cylinder 11 to release the tube 5, which pressurize the cylinder 15 to raise the wire 9 and downstream end 38 up to insert the wire 9 into the nip 54 formed between the two drums, and which energize the electromagnet 35. Thus the wire 9 will be pressed upward by the guide 7 into the helical groove of the upper drum 2 whose rotation will pull the wire 9 axially inward, sliding it along the guide 7 until the wire 9 is engaged also in the groove of the shorter lower drum too in the manner described in some detail in the above-cited commonly owned applications. The guide 7 also lifts the downstream end 38 of the now freely swingable guide tube 5 to prevent any strain from being placed on the rapidly moving wire 9.

When the wire 9 and the tube end 38 have been pulled axially inwardly by the drums 2 and 3 off the guide 7 to the blades 28 and 29 the downstream end portion of the wire 9 is cut off by these two blades 28 and 29. This cut-off piece will move out of the apparatus through the scrap-wire passage 26 and guide 27. The following piece of wire will move straight along the line L, however, so as to enter the good-wire passage 31 and thence move out of the machine through the guide 52. In this position the wire 9 is passing between circumferential grooves of the two drums 2 and 3 and the movable tube 5 is held in place against the wall 55 by the electromagnet 35.

Figure 9:
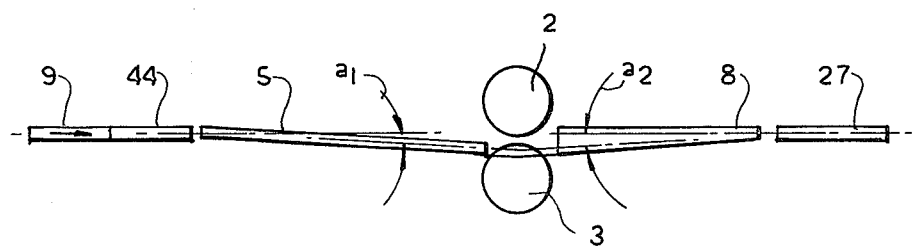
FIGS. 9 and 10 are schematic side and top views illustrating the invention.
Figure 10:
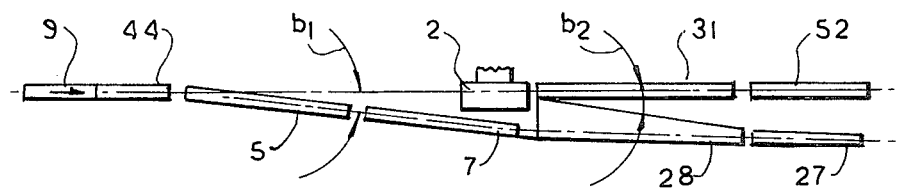

As shown in FIGS. 9 and 10 the tube 5 deflects the wire 9 down through an angle $a_1$ to the nip 54 and then up through an angle $a_2$ to the guide tube 7, as well as horizontally through an angle $b_1$. All of these angles lie between 0° and 2°. The flanks of the wedge 30 define an angle $b_2$ equal to between 2° and 15°.

Figure 7:
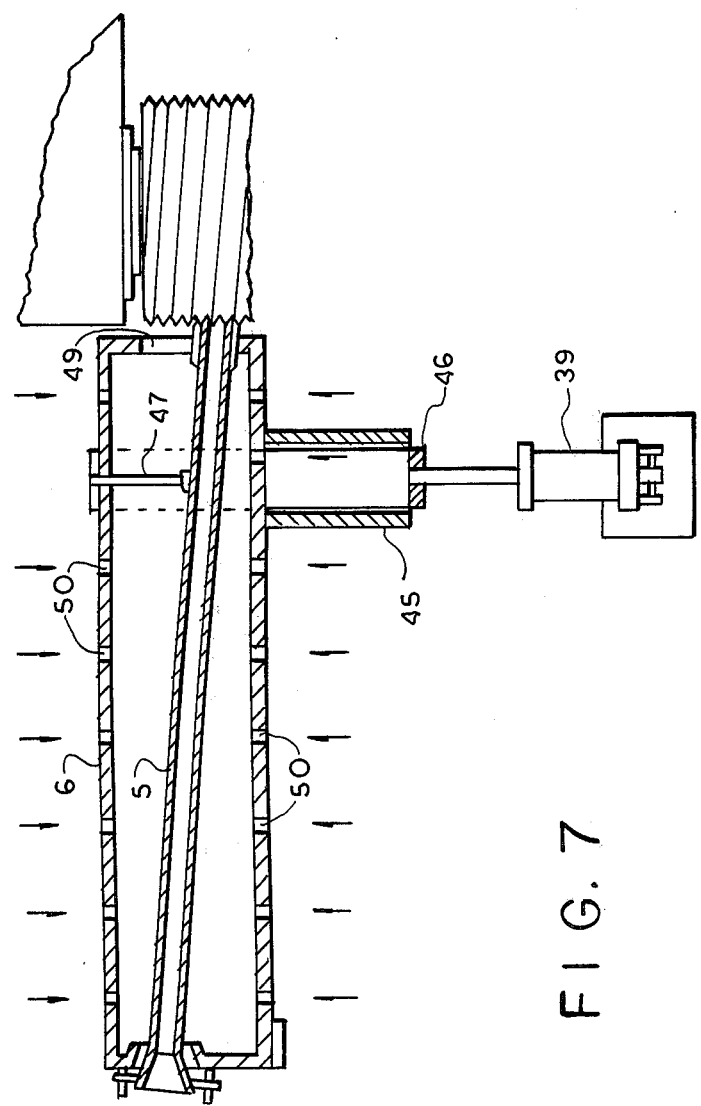
FIG. 7 is a section taken along line VII—VII of FIG. 6.
Figure 8:
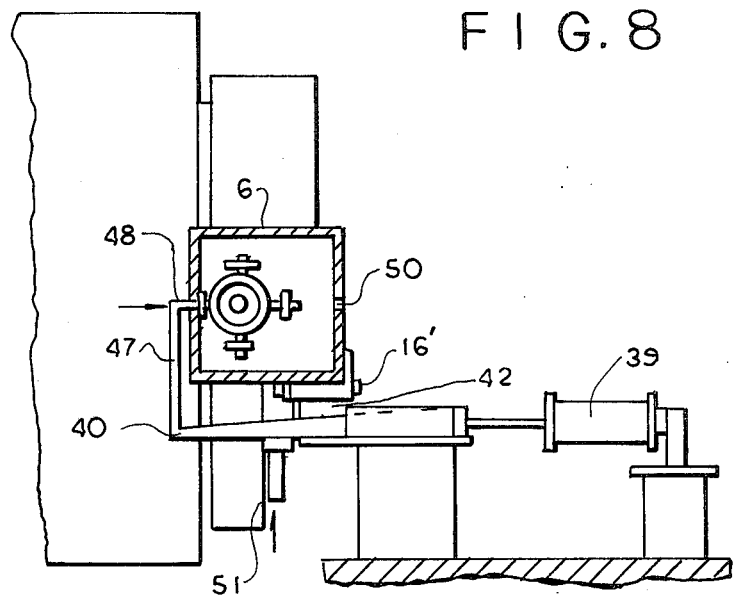
FIG. 8 is a front view of the second embodiment of the invention.

The arrangement of FIGS. 6–8 functions substantially the same as that of FIGS. 1–5 and 9–10, with identical reference numerals being assigned to functionally identical structure.

Here a guide 43 takes the place of the guide 7 and is carried on an arm 41 pivoted about a horizontal pivot 16' on the sleeve 6. A horizontally extensible fluid cylinder 39 can horizontally displace a wedge 40 horizontally in a track 45 perpendicular to the transport direction D. This wedge 40 carries on its outer end an upstanding arm 47 that in turn carries a pusher plate 48 engageable with the tube 5. A stop 46 defines an outer end position for these members. The arm 41 is provided on its underside with a plate or counterwedge 42 flatly engaging the wedge 40 so that transverse displacement of the wedge 40 raises or lowers the arm 41 and the guide 43.

The sleeve 6 is formed with laterally opening coolant holes 50 and with a coolant drain 51. In addition its downstream end wall is formed with a guide slot 49 in which the downstream end 38 of the tube 5 is engaged, with a bushing 37 being employed in case the tube end 38 is too small, normally about 5.5 mm–6.5 mm.

In this system the cylinder 39 expands to push the wire 9 and end 38 up into the groove of the upper drum 2. Once engaged in the groove, of course, the rotation of the drums 2 and 3 move the wire 9 and tube end 38 axially inwardly. For opposite motion the cylinder 39 is contracted to push the tube 5 back with the pusher plate 48.

I claim:

1. A wire shear comprising:
 a pair of vertically superposed cutter drums defining a nip and having at least one cutter blade, said drums being rotatable about respective parallel axes defining a plane and formed with entrainment grooves;
 a swingable elongated guide tube having a downstream end closely juxtaposed with and directed into said nip and an upstream end;
 pivot means at said upstream end for vertical and horizontal transverse displacement of said downstream end relative to said upstream end;
 means for feeding a wire moving at high speed into said upstream end in an upstream-to-downstream transport direction;
 an upstream guide upstream of said plane, engageable with said downstream end, and extending into said nip substantially to said plane;
 a downstream guide downstream of said plane, aligned with said upstream guide, and having a floor plate extending upstream substantially to said plane and a guide wall extending upstream past said plane and past said downstream end; and
 means for raising said upstream guide and thereby raising said downstream end and said wire at said downstream end to press the wire into the groove of the upper cutter drum, the downstream end being freely horizontally and transversely displaceable when raised by the upstream guide so that when thus raised the wire and downstream end are horizontally entrained by the rotating cutter drums.

2. The shear defined in claim 1 wherein said sleeve is provided adjacent said downstream end with an electromagnet energizable to attract and hold said downstream end.

3. The shear defined in claim 1, further comprising:
 a cooling sleeve surrounding said tube between said ends thereof and formed with transversely throughgoing holes, and
 means for passing a coolant through said sleeve and thereby cooling said guide tube and said wire therein, said means for passing said coolant being connected to said holes for introducing said coolant into said sleeve through said holes.

4. The shear defined in claim 3 wherein said holes include upstream holes inclined at an acute angle to and directed generally in said transport direction.

5. The shear defined in claim 4 wherein said holes include downstream holes directed generally perpendicularly to said transport direction at said guide tube.

6. The shear defined in claim 1 wherein said downstream end is provided with at least one removable bushing engageable with said upstream guide, whereby said bushing is used with small-diameter wire.

7. The shear defined in claim 1 wherein said means for raising includes a fixed abutment and a wedge operatively engageable between said fixed abutment and said upstream guide.

8. The shear defined in claim 1 wherein said tube is deflectable through an angle of at most 2° in said sleeve.

9. The shear defined in claim 1 wherein said downstream guide has a wedge having flanks lying at an angle of between 2° and 15° and defining a pair of output passages extending generally in said transport direction.

10. The shear defined in claim 1 wherein said upstream guide is only pivotal about a horizontal axis transverse to said transport direction.

* * * * *